US012596079B2

(12) United States Patent
Claeys

(10) Patent No.: US 12,596,079 B2
(45) Date of Patent: Apr. 7, 2026

(54) ASSEMBLY FOR SENSORY AND VISUAL INSPECTION OF A CLOSED STORAGE TANK

(71) Applicant: TANK-EYE IE B.V., Hendrik-Ido-Ambacht (NL)

(72) Inventor: Deef Claeys, Rotterdam (NL)

(73) Assignee: TANK-EYE IE B.V., Hendrik-Ido-Ambacht (NL)

( * ) Notice: Subject to any disclaimer, the term of this patent is extended or adjusted under 35 U.S.C. 154(b) by 259 days.

(21) Appl. No.: 18/283,270

(22) PCT Filed: Mar. 22, 2022

(86) PCT No.: PCT/EP2022/057410
§ 371 (c)(1),
(2) Date: Sep. 21, 2023

(87) PCT Pub. No.: WO2022/200304
PCT Pub. Date: Sep. 29, 2022

(65) Prior Publication Data
US 2024/0175828 A1 May 30, 2024

(30) Foreign Application Priority Data
Mar. 22, 2021 (NL) ...................................... 2027794

(51) Int. Cl.
| | |
|---|---|
| *G01N 21/954* | (2006.01) |
| *H04N 23/50* | (2023.01) |
| *H04N 23/52* | (2023.01) |
| *H04N 23/698* | (2023.01) |

(52) U.S. Cl.
CPC ........... *G01N 21/954* (2013.01); *H04N 23/52* (2023.01); *H04N 23/555* (2023.01); *H04N 23/698* (2023.01)

(58) Field of Classification Search
CPC .... G01N 21/954; H04N 23/52; H04N 23/555; H04N 23/698; G01M 3/226; G01M 5/0033; G01M 3/38; G02B 23/2492
See application file for complete search history.

(56) References Cited

U.S. PATENT DOCUMENTS

| | | | | |
|---|---|---|---|---|
| 5,604,532 | A | 2/1997 | Tillmanns | |
| 7,461,547 | B2 * | 12/2008 | Terabayashi | ............. G01N 9/36 73/152.55 |
| 10,508,968 | B1 | 12/2019 | Vaganay | |
| 10,954,648 | B1 * | 3/2021 | Blackshaw | ............. G06T 17/00 |

(Continued)

FOREIGN PATENT DOCUMENTS

| | | |
|---|---|---|
| EP | 1156304 A1 | 11/2001 |
| EP | 3702762 A1 | 9/2020 |

OTHER PUBLICATIONS

International Search Report and Written Opinion for the International Application No. PCT/EP2022/057410, mailed Jul. 1, 2022, 13 pages.

*Primary Examiner* — Seung C Sohn
(74) *Attorney, Agent, or Firm* — KDW Firm PLLC

(57) ABSTRACT

An assembly for sensory and visual inspection of a closed storage tank for holding petrochemical liquids. A method for sensory and visual inspecting a closed storage tank for holding petrochemical liquids with the assembly and the use of the assembly in visual and sensory inspection of a closed tank.

19 Claims, 2 Drawing Sheets

(56)          References Cited

U.S. PATENT DOCUMENTS

Figure 1:
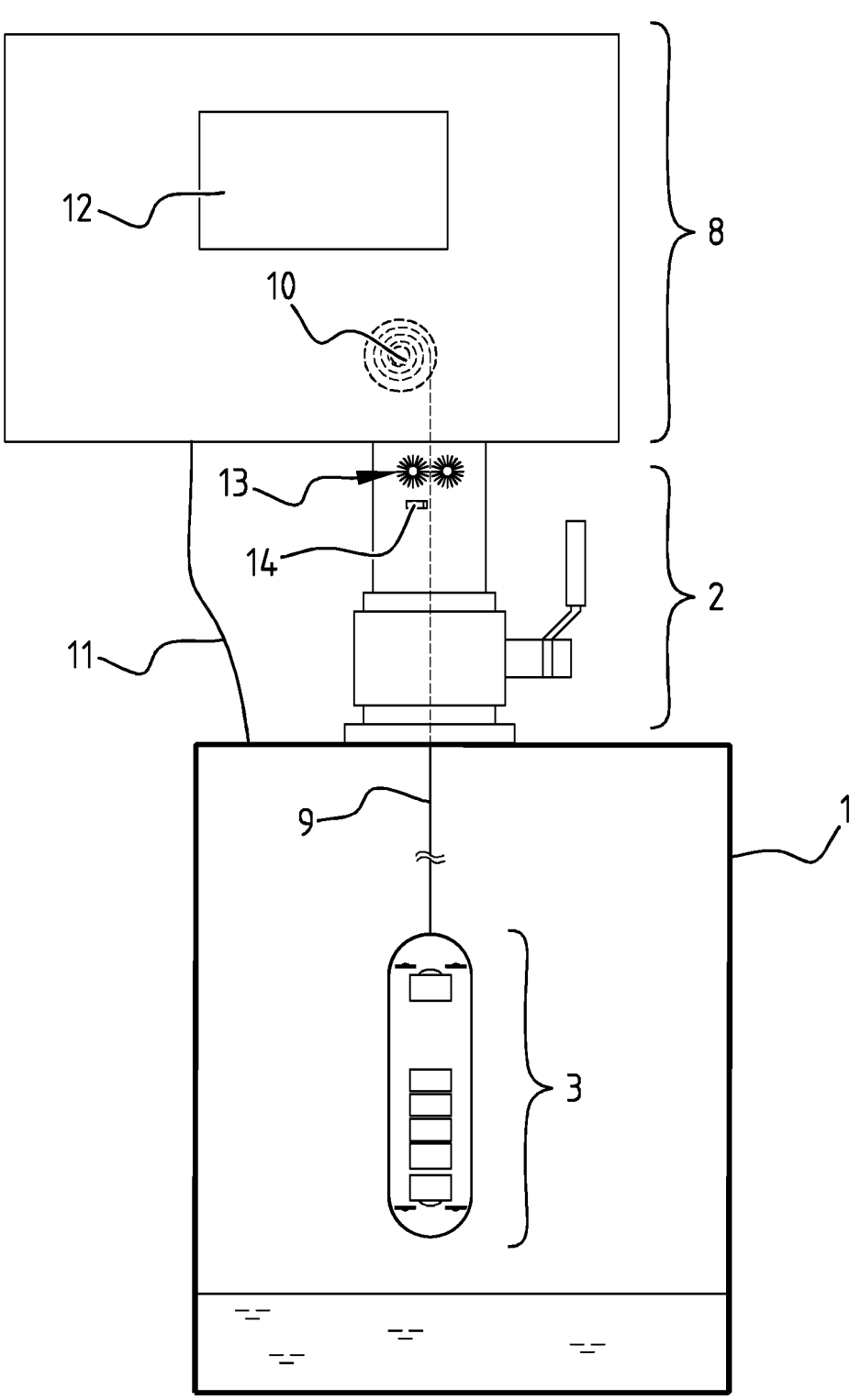

| 11,933,712 | B2 * | 3/2024 | Maresca, Jr. | .......... | G01N 17/00 |
| 2004/0006448 | A1 | 1/2004 | Penza | | |
| 2012/0281096 | A1 * | 11/2012 | Gellaboina | ............ | G01S 15/88 |
| | | | | | 342/179 |
| 2020/0047016 | A1 | 2/2020 | Staires | | |

* cited by examiner

ASSEMBLY FOR SENSORY AND VISUAL INSPECTION OF A CLOSED STORAGE TANK

This application is a national stage filing under 35 U.S.C. 371 of pending International Application No. PCT/EP2022/ 057410, filed Mar. 22, 2022, which claims priority to Netherlands patent application 2027794, filed Mar. 22, 2021, the entirety of which applications are incorporated by reference herein.

The present invention relates to an assembly for sensory and visual inspection of a closed storage tank for holding petrochemical liquids. The present invention further relates to a method for sensory and visual inspecting a closed storage tank for holding petrochemical liquids with the assembly and the use of the assembly in visual and sensory inspection of a closed tank.

When a cargo vessel, such as tankers of tank vessels enters the harbor for loading, the cargo tanks of the ship must be "load-ready", i.e. suitable, empty and cleaned for the receiving new cargo. Most tankers transport hazardous chemicals such as diesel, gasoline, kerosene, alcohols, bio-fuels, and other chemicals. Prior to any transfer of cargo, a transfer plan is prepared detailing specifics of the cargo being moved, which tanks will be cleaned, and how the ship's ballasting will change and cargo tanks are cleaned before refilled with cargo. After a tank is cleaned and is prepared for new entry of cargo, the tank will be purged by pumping inert gas into the tank until hydrocarbons have been sufficiently expelled. These tank vessels are filled with an inert gas to prevent undesirable chemical reactions and reduces the oxygen level to ensure there is no rich mixture having a high a fuel to oxygen ratio that could ignite and explode when docked near the harbor. Two affordable and readily available inert gasses that are mostly used in the industry are carbon dioxide and nitrogen gas. Due to the inert gas, the cargo tanks are under a certain overpressure (+/−1 bar) and need to stay completely closed at all times to ensure safety and comply with the harbor safety rules.

Before the vessel can load its cargo the tanks must undergo a cleanliness inspection, also known as "suitability inspection". This inspection is carried out by an independent inspector or surveyor that is specialized in liquid bulk cargo surveys. However, the maintaining the overpressure to ensure safety, while at the same time perform proper ship inspection in respect to a sufficient clean and empty cargo space of the tankship is very challenging. In order to maintain the overpressure the cargo tanks must remain closed and the inspector is not able to perform an 'open visual cleanliness inspection' and so it is only possible to carry out a 'close inspection' by means of 'dipping'. Dipping of fuel tanks is good business practice because it reconciles the fuel or other chemicals left in the tank and prevent unwanted mixing and contamination of the cargo load with other chemicals. Keeping a close watch on the levels in storage tanks will ensure its quality and condition. The accurate determination of cargo quantities on board a vessel is important for safety, commercial and legal reasons. Cal-culating ship/shore and shore/shore cargo differences is also very important. One of the biggest necessities in being able to effectively account for large volumes of liquids such as oil within the industry is a uniform set of terms and definitions for oil measurement.

Dipping is done via a metal dipstick with a diameter of approximately 0.5 to 1 cm and is attached to a closed sampling device. The closed sampler can also be used for sampling of cargo after loading. The closed sampler is attached to the deck tank hatch and the tank valve is opened and the metal stick is slowly lowered to the bottom of the cargo tanks. Once the stick has reached the bottom of the tank the inspector winds up the sampler and lifts the stick up until it is back in the closed sampler. The valve can now be closed and the sampler can be disconnected from the hatch and the inspector will determine from the dipstick if the cargo tank is empty or not. Drawback of the dipping method is that it determines the content of the cargo tank at a limited position and space of approximately 1 cm2. However, most tankers have a cargo space of 1000 m2 and 20.000 m3, and in addition the vessel and cargo space always has a little positive trim where no access or visual sight into the tank can be achieved and optimal determination of the residual fluid is not possible. Often a substantial amount of pumpable liquid is still present in the storage tank, even with a "zero dip" result. Therefore the dipping method does not provide a reliable measurement or determination of the cleanliness or residual content of the cargo tank and the inspector cannot guarantee that the tanks are actually suitable for receiving new cargo. Residual chemical liquids of the previous cargo or washing water in case of cleaning may still be present in significant amounts that may contaminate the new cargo and affect its quality/product specifications.

Furthermore, visual inspection is also available and pos-sible for most cargo tankers. However due to the risk involved, visual inspection is only permitted at open sea and is a very expensive undertaking. It takes a lot of time to release the inert gasses from the cargo tanks, experience personnel and highly specific tools (i.e. ATEX zone o certified) are needed to inspect and after inspections the tanks needed to be filled again with inert gas which takes a lot of time. Therefore, reductions of such visual inspections will safe a lot of costs and time and visual inspection is often not preferred (although sometimes necessary) in cargo tank inspections.

The current devices used to visual inspect storage tanks can not handle pressurized tanks, and are not ATEX zone o certified (i.e. certified to be used in explosive hazardous environments. The dipping method and device used can only 'dip' 1 cm$^2$ of a tank and measure if any product or wash water is left. It can not access closed spaces via the tight valves (max 2 to 10 cm) of most storage tanks. Furthermore current devices can only measure either innage or ullage, or free water or temperature and separate devices are required to determine each variable simultaneously.

Considering the above, there is a need in the art for a device for visual inspection of storage tanks, especially storage tanks used in the petrochemical industry, that can operate in an overpressure environment (+/−1 bar), is ATEX zone o certified, can visualize the entire tank volume and at the same time provide real time sensory data on temperature, pressure, gas concentrations (e.g. $O_2$ $CO_2$ or $N_2$), innage and ullage status inside the storage tank, and without the need to remove inert gas from these storage tanks before inspection.

It is an object of the present invention, amongst other objects, to address the above need in the art. The object of present invention, amongst other objects, is met by the present invention as outlined in the appended claims.

Specifically, the above object, amongst other objects, is met, according to a first aspect, by the present invention by an assembly for sensory and visual inspection of a closed storage tank for holding petrochemical liquids, wherein the assembly is comprised of a valve adaptor arranged to be connected to a valve of the storage tank an inspection module arranged to be inserted into the storage tank for sensory and visual inspection, wherein said inspection module comprises at least one camera, two or more sensors comprising a temperature sensor and gas sensor for detection of $O_2$, $CO_2$, $H_2S$, $N_2$, and/or $H_2O$, one or more light source(s), and data transmission means, a display module that is arranged outside the storage tank for visual and data output obtained and received from the inspection module, a cable connecting said inspection module to said display module for data and power transfer between the modules and for holding the weight of the inspection module a winch system for holding said cable and for hoisting and substantially vertical movement of the inspection module during sensory and visual inspection of the storage tank, and insertion and/or removal of the inspection module into/from the storage tank.

The assembly of present invention enables a visual inspection of closed, ATEX zone o, with inert gas filled, pressurized storage tanks being used in the (petro) chemical industry. Such cargo tanks are used to hold petrochemical liquids, bio-chemicals, biofuels and liquefied gas or pressurized gas. Due to the valve adaptors the assembly can be connected to any kind of ship deck tank hatch. Once connected to the ship cargo tank via the valve adaptor, the assembly of present invention can start visual inspection. The display module comprises at least one screen or display or other output means on which the visual and sensory data can be viewed and further analysed. The user of the assembly activates the display module for example by using a touchscreen of the display module and enters the needed data (e.g. ship name, reference number, date, time & cargo tank) in the display module running an software application. The inspector then lowers the inspection module attached to the cable connecting said inspection module to said display module via the winch system holding said cable for hoisting and vertical movement of the inspection module during sensory and visual inspection inside the storage tank. The winch system enables removal of the inspection module from the storage tank when the inspection is completed to ensure the closed environment of the storage tank.

The inspection module preferably does not comprise a power unit because of strict safety regulations inside the storage tanks, i.e. in view of electricity, static charges in an explosive environment. Therefore the inspection module is powered by the cable connecting the inspection module with the display module which comprises a power source such as a battery.

The assembly of present invention will lower the risks involved with storage tank inspection and improve the inspection process. Product losses and loading of new products into not fully unloaded storage tanks (or dirty tanks) is avoided because of the easy visual inspection, lowering the risk of that the new product will be contaminated or off spec. The visual inspection process in significantly quicker as compared to present visual inspections in for example the shore tanks where they need to open a manhole with more than 100+ bolts to be removed in order to inspect the tank by eye. For inland barges it is sometimes still possible to inspect the empty cargo tanks visually via open hatches with an explosion-free flashlight, but it is increasingly common that the cargo tanks must remain closed due to stricter storage terminal, refinery and authorities rules and regulations and environmental legislation. As a result, a visual inspection from above (i.e. deck level) is no longer possible and the cargo tanks must remain completely closed, and so it is only possible to perform a closed inspection by means of 'dipping', having the drawbacks as indicated earlier. Furthermore, it is expected that the rules and legislation will become even stricter in the future and that storage tanks, such as barges must be keep closed at all times.

According to a preferred embodiment, the present invention relates to the assembly, wherein the inspection module is of a cylindrical shape and has a length of 2 to 80 cm, preferably 5 to 50 cm, more preferable 10 to 25 cm, and has a diameter of 1 to 10 cm, preferably 2 to 8 cm, more preferably 3 to 7 cm. The inspection module is comparable to a probe that is inserted to the small valve of the tank hatch (often up to 20 cm in diameter). The inspection module is equipped with a high quality camera, preferably providing a 360° view, and powerful (LED) lights. While lowering the inspection module the inspector can observe on the display module the inside of the cargo tank and has the ability to take photo's/video's during inspection in addition to obtain further sensory data such as pressure, gas concentration, temperature, innage and ullage status. The present assembly is able to perform innage and ullage measurement, wherein innage measurement is the determination of the height of the liquid in the tank and ullage is the void space in the tank measured from the top of the tank to the upper surface of the fluid. Ullage is often measured when the content of a tank is highly viscous and if the tank is filled to the maximum. On the basis of the visual and sensory data obtained via the inspection module inside the storage tank and visualized on the display module outside the storage tank, the inspector can determine the contents and status of the storage tank for example for receiving new cargo.

According to another preferred embodiment, the present invention relates to the assembly, wherein the two or more sensors are additionally selected from the group consisting of a pressure sensor, shock- or impact sensor, vibration sensor, magnetic sensor, conductivity sensor for detection of O2, CO2, H2S, N2, and/or H2O, infrared sensor, ultrasonic sensor array, LEL sensor, illuminometer, phased array radar. The inspection module comprises several sensors to collect sensory data in the storage tank to enable the used of the assembly to make an assessment of the content and status of the storage tank. If the tank is empty or not, where the liquid is located if there is some residual in the tank, the temperature and gas concentrations in the tank, the status of the integrity of the tank, if there are any ruptures in the tank where spillage may occur, data for the determination of explosion risk, etc. In case the inspection module comprises a conductivity sensor, it will be located on the outer surface of the inspection module for optimal conductivity measurements.

According to a preferred embodiment, the present invention relates to the assembly, wherein the data transmission means are one or more selected from the group consisting of WiFi, IOT, IR, RFID, Bluetooth, BLE, and radio transmitter. The visual and sensory data collected by the inspection module can be transferred to the display module of the assembly real time for inspection and analysis.

According another preferred embodiment, the present invention relates to the assembly, wherein the display module is comprised of one or more receiving means for receiving the visual and sensory data from the inspection module. The data is either transferred by the cable connecting the inspection module to the display module or via the data transmission means of the inspection module transferring data to the receiving means of the display module. The display module comprises at least one screen (12) or other visual output means on which the visual and sensory data can be viewed and further analysed.

According to yet another preferred embodiment, the present invention relates to the assembly, wherein the display module is further comprised of a processor, wherein the processor calculates on the data obtained from the inspection module the position and amount of liquid within the storage tank and/or generating a three-dimensional image of the storage tank based on said data. The display module may comprise a powerful and bright touchscreen to directly have access to clear live images and/or videos in order to observe the actual situation in the tank space. Furthermore the display module may arrange to execute a software application that can receive, process and send the sensory data, photos and videos directly to any receiver via an internal sim world card (5G).

According to yet another preferred embodiment, the present invention relates to the assembly, wherein the cable has a length of at least 0.5 m, preferably at least 1 m, more preferably at least 5 m, even more preferably at least 10 m, most preferably at least 25 m, preferably at least 40 m, more preferably at least 60 m. Most storage tanks in the petrochemical industry have a depth of maximum 60 m, when measured from the top deck hatch or valve to the bottom of the storage tank.

According to a preferred embodiment, the present invention relates to the assembly, wherein the inspection module is covered by a transparent removable casing, wherein the casing is of glass or polymer material. To protect the sensors and cameras of the sensory module, it can be inserted into a protective transparent casing. This also enables an easy replacement of a casing that has been damaged or has become very dirty during inspection.

According to yet another preferred embodiment, the present invention relates to the assembly, wherein the one or more light sources is a LED light, laser light, ATEX zone 0 light. LED is preferred because it is a light source that can be easily varied in intensity, power and light colour, providing a more versatile light source for tank inspections.

According to another preferred embodiment, the present invention relates to the assembly, wherein the camera comprises heating elements for preventing condensation of the camera during inspection. During visual inspection due to elevated temperatures, gas and damp formation, the lens of the camera may condensate hampering or even preventing clear visual inspection. Heating elements in the camera prevents the condensation of the lens ensuring clear visual inspection.

According to another preferred embodiment, the present invention relates to the assembly, wherein the at least one camera is providing a 360° view and is one or more selected from the group consisting of hi-definition camera, infrared camera, hyperspectral camera, 3D camera. Hyperspectral imaging take advantage of the spatial relationships among the different spectra in a neighbourhood, allowing for elaborate spectral-spatial models and for accurate segmentation and classification of the image. Another advantage of hyperspectral imaging is that an entire spectrum is acquired at each point, and the operator needs no prior knowledge of the sample.

According to a preferred embodiment, the present invention relates to the assembly, wherein the assembly is explosion-proof and ATEX Zone 0 compliant. Under the European ATEX directives (153 and 114) employers are legally obliged to indicate ATEX zoning in areas where explosive substances are present. This zone classification for explosion hazard is determined on the basis of a risk inventory and evaluation. ATEX approved equipment is divided into categories, which indicate in which zones it may be used, so that this equipment cannot ignite an explosive atmosphere. The zones with gas or vapor explosion risk are prevented with zone 0, 1 or 2. The assembly of present invention can comprise an earthing or grounding wire that connects the display module with the storage tank as the earth's conductive surface for safety and functional purposes in relation to static dissipation by sending any built up static discharge during inspection to the ground.

According to yet another preferred embodiment, the present invention relates to the assembly, wherein the winch system further comprises an automatic cable cleaner and cable roll-up sensor. The winch may comprise an automatic stop system to prevent the sensory module being dropped down into the storage tank with high speed, and a wire cleaner such that the system remains clean.

The present invention, according to a second aspect, relates to a method for sensory and visual inspecting a closed storage tank for holding petrochemical liquids and gases with the assembly of present invention, wherein the method comprises the steps of, a) connecting the assembly via a valve adaptor to a valve or hatch of the closed storage tank, b) inserting the inspection module of the assembly into the storage tank, c) lowering the inspection module via the winch system into the storage tank, d) performing a 360° visual and sensory inspection inside the storage tank providing visual and sensory data e) transfer of the visual and sensory data to the display module, and f) analysis of the visual and sensory data by the display module to determine the content of the closed storage tank. The method of present invention enables the inspection of closed storage tanks used for holding petrochemical liquids, bio-chemicals, biofuels and liquefied gas or pressurized gas. The method enables real time sensory data collection and visual inspection providing more accurate inspection combining the various visual and sensory data.

According to yet another preferred embodiment, the present invention relates to the method, wherein the visual data is one or more selected from the group consisting of photos, videos, infrared images, three-dimensional images, hyperspectral images.

According to yet another preferred embodiment, the present invention relates to the method, wherein the sensory data is one or more selected from the group consisting of temperature, pressure sensor, magnetic force, conductivity, gas concentration ($O_2$, $CO_2$, $H_2S$, $N_2$, and/or $H_2O$), heat map, tank integrity data (radar, ultrasonic).

According to yet another preferred embodiment, the present invention relates to the method, wherein the transfer of the visual and sensory data to the display module is via the cable connecting the inspection module to the display module and/or via the data transmission means.

According to yet another preferred embodiment, the present invention relates to the method, wherein the storage tanks are closed tanks of a container ship, tanker, ballast tanks, bunker tanks, cofferdam, fresh water tank, shore tanks.

The present invention, according to a third aspect, relates to the use an assembly of present invention for sensory and visual inspection of a closed storage tank for holding petrochemical liquids.

The present invention will be further detailed in the following figures wherein:

FIG. 1: shows the assembly of present invention connected to a closed storage tank (1) when performing visual and sensory inspection inside the closed tank. The assembly comprises a valve adaptor (2) arranged to be connected to a valve of the storage tank (1), an inspection module (3) arranged to be inserted into the storage tank (1) for sensory and visual inspection and a display module (8) that is arranged outside the storage tank (1) for visual and data output obtained and received from the inspection module (3). A cable (9) connects the inspection module (3) with the display module (8) via a winch system (10) that is located in the display module (8). The winch system (10) holding the cable (1) enables hoisting and substantially vertical movement of the inspection module (3) during sensory and visual inspection of the storage tank (1), and insertion and/or removal into/from the storage tank. The display module (8) comprises at least one screen (12) or other visual output means on which the visual and sensory data can be viewed and further analysed. The cable (9) may be used for both data and power transfer between the modules and for holding the weight of the inspection module (3). The display processes and visualizes the data obtained from the inspection, generating a (three-dimensional) image of the storage tank and its content. Inside the valve adaptor, close near the winch system, an automatic cable cleaner (13) and cable roll-up sensor (14) may be provided. The automatic stop system (14) prevents the sensory module being dropped down into the storage tank with high speed. The wire cleaner (13) enables cleaning of the cable (9) during the winching process and movement of the inspection module (3), such that the cable and assembly remains clean after inspection. The assembly of present invention may also comprise a grounding wire (11) for static dissipation by sending any built up static discharge generated during tank inspection to the ground via the storage tank (1).

Figure 2:
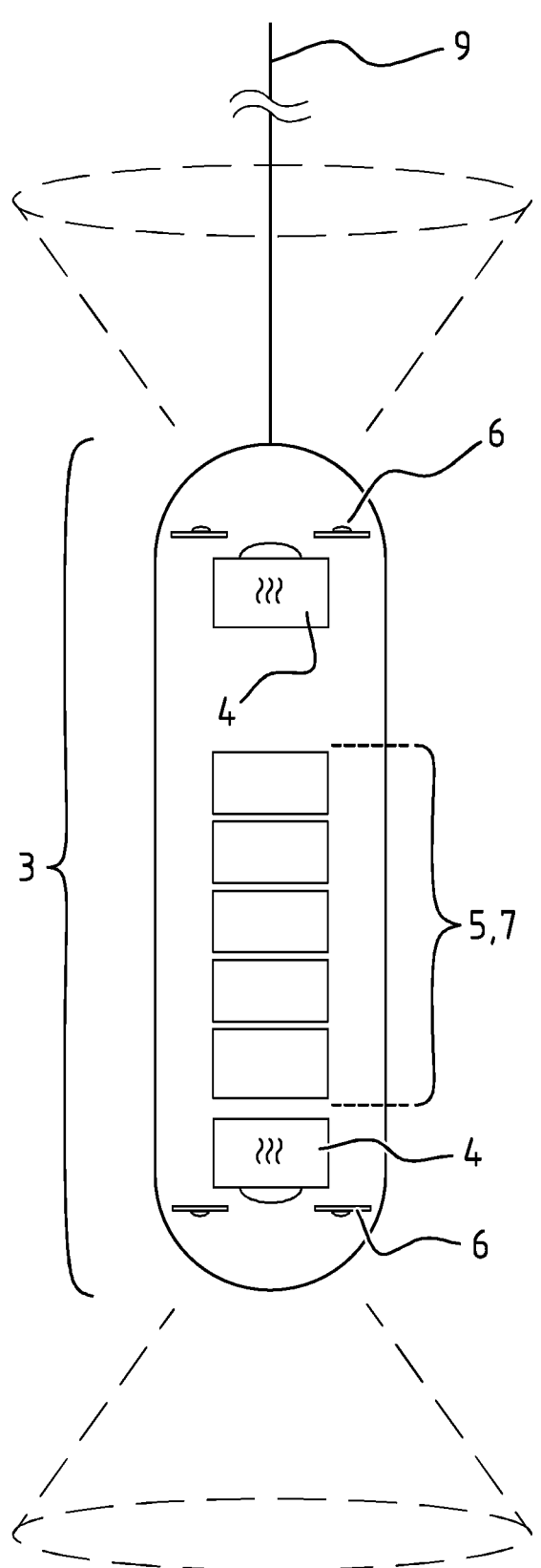

FIG. 2: shows a blow up of the inspection module (3) of the assembly of present invention. The inspection module (3) comprises at least one camera (4), in this case two cameras providing 360° view inside the storage tank, two or more sensors (5), for example a temperature sensor, pressure sensor, magnetic sensor, conductivity sensor and gas sensor for detection of O2, CO2, H2S, N2, and/or H2O, infrared sensor, ultrasonic sensor array, or phased array radar. The inspection module (3) further comprises one or more light source(s), in this case four light sources (6), preferably LED lights, and data transmission means (7), for example WiFi, IOT, IR, RFID, Bluetooth, BLE, and radio transmitter.

The invention claimed is:

1. An assembly for sensory and visual inspection of a closed storage tank for holding petrochemical liquids, wherein the assembly comprises:

a valve adaptor arranged to be connected to a valve of the storage tank;

an inspection module arranged to be inserted into the storage tank for sensory and visual inspection, wherein said inspection module comprises at least one camera, two or more sensors comprising a temperature sensor and gas sensor for detection of $O_2$, $CO_2$, $H_2S$, $N_2$, and/or $H_2O$, one or more light source(s), and data transmission means, a display module arranged outside the storage tank for visual and data output obtained and received from the inspection module;

a cable connecting said inspection module to said display module for data transfer between the modules and for power transfer from the display module to the inspection module, and for holding the weight of the inspection module; and a winch system for holding said cable and for hoisting and substantially vertical movement of the inspection module during sensory and visual inspection of the storage tank, and insertion and or removal of the inspection module into/from the storage tank;

wherein the valve adapter enables the inspection module to be inserted into the storage tank while the storage tank remains closed.

2. The assembly according to claim 1, wherein the inspection module is of a cylindrical shape and has a length of 2 to 80 cm.

3. The assembly according to claim 1, wherein the two or more sensors are additionally selected from the group consisting of, pressure sensor, shock- or impact sensor, vibration sensor, magnetic sensor, conductivity sensor, infrared sensor, ultrasonic sensor array, LEL sensor, illuminometer, phased array radar.

4. The assembly according to claim 1, wherein the data transmission means are one or more selected from the group consisting of WiFi, IOT, IR, RFID, Bluetooth, BFE, and radio transmitter.

5. The assembly according to claim 1, wherein the display module is comprised of one or more receiving means for receiving the visual and sensory data from the inspection module.

6. The assembly according to claim 1, wherein the display module is further comprised of a processor, wherein the processor calculates on the data obtained from the inspection module the position and amount of liquid within the storage tank and/or generating a three-dimensional image of the storage tank based on said data.

7. The assembly according to claim 1, wherein the cable has a length of at least 0.5 m.

8. The assembly according to claim 1, wherein the inspection module is covered by a transparent removable casing, wherein the casing is of glass or polymer material.

9. The assembly according to claim 1, wherein the one or more light sources is a LED light, laser light, ATEX zone 0 light.

10. The assembly according to claim 1, wherein the camera comprises heating elements for preventing condensation of the camera during inspection.

11. The assembly according to claim 1, wherein the at least one camera is providing a 360° view and is one or more selected from the group consisting of hi-definition camera, infrared camera, hyperspectral camera, 3D camera.

12. The assembly according to claim 1, wherein the assembly is explosion-proof and ATEX Zone 0 compliant.

13. The assembly according to claim 1, wherein the winch system further comprises an automatic cable cleaner and cable roll-up sensor.

14. A method for sensory and visual inspecting a closed storage tank for holding petrochemical liquids and gases with the assembly of claim 1, wherein the method comprises the steps of, a) connecting the assembly via the valve adaptor to a valve or hatch of the closed storage tank, b) inserting the inspection module of the assembly into the storage tank, c) lowering the inspection module via the winch system into the storage tank, d) performing a 360° visual and sensory inspection inside the storage tank providing visual and sensory data, e) transfer of the visual and sensory data to the display module, and f) analysis of the visual and sensory data by the display module to determine the content of the closed storage tank.

15. The method for sensory and visual inspecting a closed storage tank according to claim 14, wherein the visual data is one or more selected from the group consisting of photos, videos, infrared images, three-dimensional images, hyperspectral images.

16. The method for sensory and visual inspecting a closed storage tank according to claim 14, wherein the sensory data is one or more selected from the group consisting of temperature, pressure sensor, magnetic force, conductivity, gas concentration ($O_2$, $CO_2$, $H_2S$, $N_2$, and/or $H_2O$), heat map, tank integrity data (radar, ultrasonic).

17. The method for sensory and visual inspecting a closed storage tank according to claim 14, wherein the transfer of the visual and sensory data to the display module is via the cable connecting the inspection module to the display module and or via the data transmission means.

18. The method for sensory and visual inspecting a closed storage tank according to claim 14, wherein the storage tanks are closed tanks of a container ship, tanker, ballast tanks, bunker tanks, cofferdam, fresh water tank, shore tanks.

19. A use of an assembly of claim 1 for sensory and visual inspection of a closed storage tank for holding petrochemical liquids.

* * * * *